(No Model.) 5 Sheets—Sheet 2.
S. H. BLOOMER.
ROTARY ENGINE.

No. 475,176. Patented May 17, 1892.

WITNESSES:
Fred G. Dieterich
Jos. A. Ryan

INVENTOR:
Stephen H. Bloomer
BY Munn & Co
ATTORNEYS (No Model.) 5 Sheets—Sheet 3.

S. H. BLOOMER.
ROTARY ENGINE.

No. 475,176. Patented May 17, 1892.

WITNESSES:
Fred G. Dieterich
Jos. A. Ryan

INVENTOR:
Stephen H. Bloomer
BY Munn & Co
ATTORNEYS (No Model.)  5 Sheets—Sheet 4.

S. H. BLOOMER.
ROTARY ENGINE.

No. 475,176.  Patented May 17, 1892.

WITNESSES:
Fred G. Dieterich
Jos. A. Ryan

INVENTOR:
Stephen H. Bloomer
BY Munn & Co.
ATTORNEYS (No Model.)  5 Sheets—Sheet 5.

S. H. BLOOMER.
ROTARY ENGINE.

No. 475,176. Patented May 17, 1892.

WITNESSES:
Fred G. Dieterich
Jos. A. Ryan

INVENTOR:
Stephen H. Bloomer
BY
ATTORNEYS

UNITED STATES PATENT OFFICE.

STEPHEN H. BLOOMER, OF EAST PORTLAND, OREGON.

ROTARY ENGINE.

SPECIFICATION forming part of Letters Patent No. 475,176, dated May 17, 1892.

Application filed June 5, 1891. Serial No. 395,274. (No model.)

*To all whom it may concern:*

Be it known that I, STEPHEN H. BLOOMER, residing at East Portland, in the county of Multnomah, in the State of Oregon, have invented certain new and useful Improvements in Rotary Engines, of which the following is a specification.

My invention relates to that class of rotary engines in which a ring-shaped steam-chamber is employed, in which operates a piston connected with and arranged to travel concentric with the main shaft; and it has for its object to provide an engine of this class which will be simple and cheap in its construction and positive and effective for its desired purpose.

My invention consists in certain details of mechanism and in the peculiar combination and novel arrangement of the several parts, all of which will hereinafter be full described in the annexed specification, and particularly pointed out in the claim, reference being had to the accompanying drawings, in which—

Figure 1:
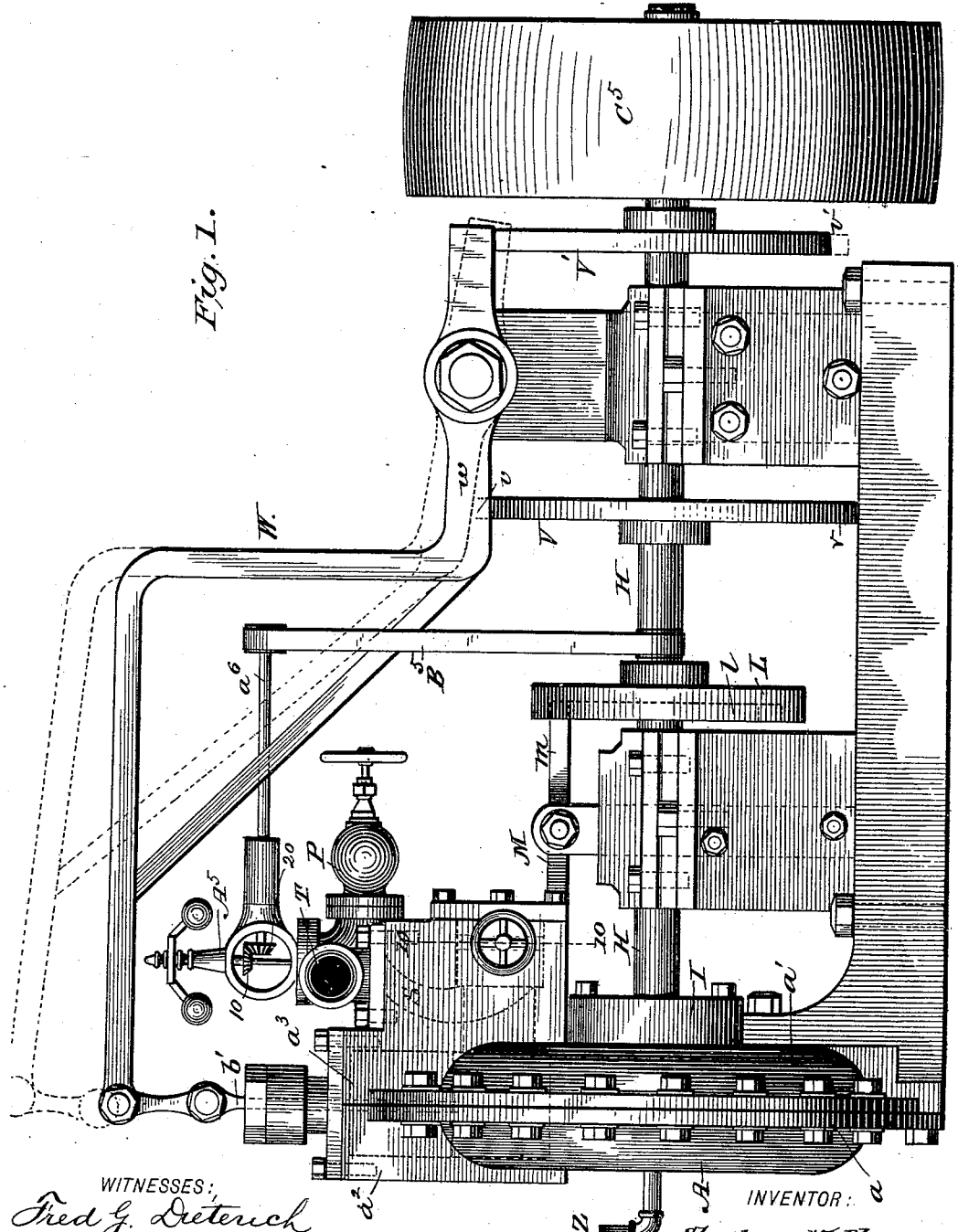
Figure 2:
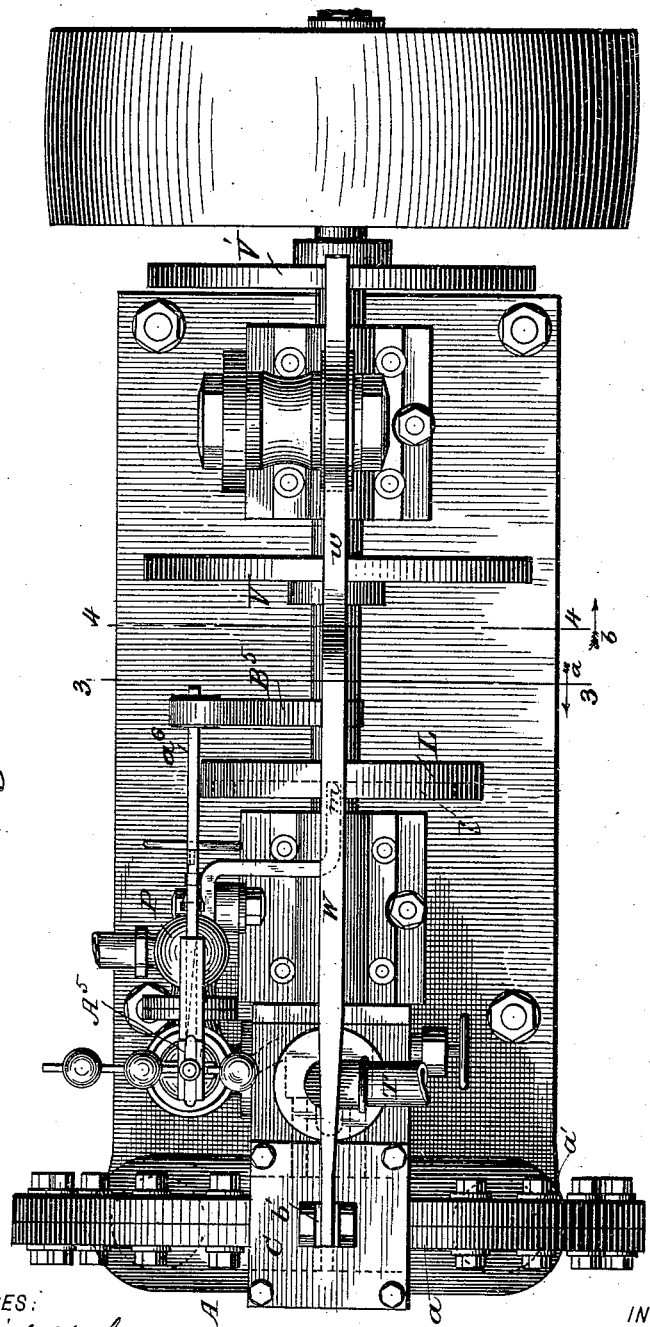
Figure 3:
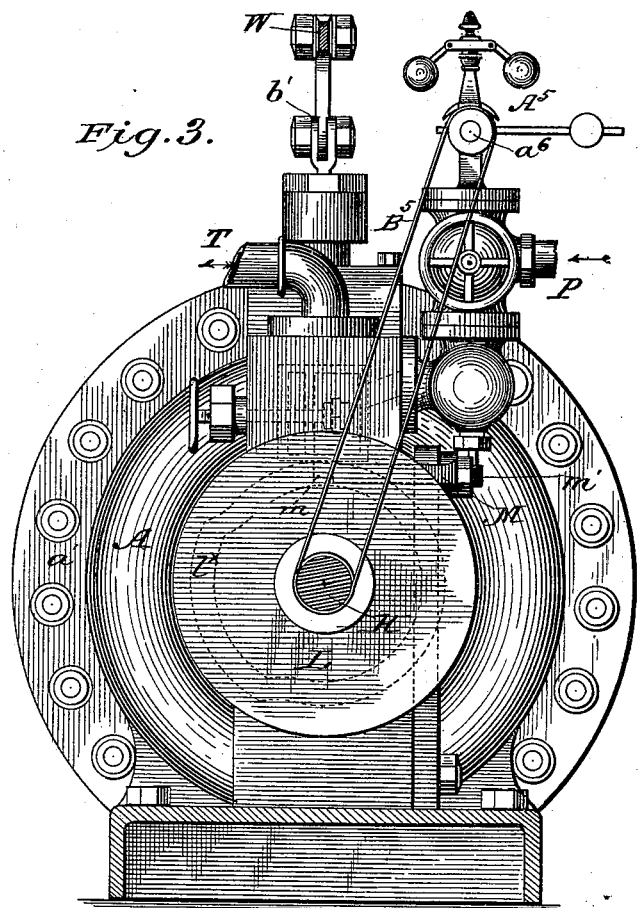
Figure 10:
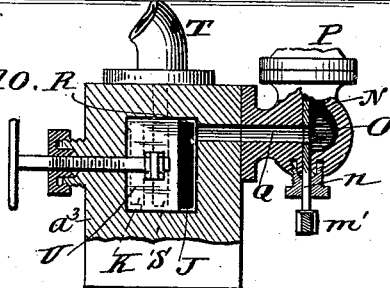
Figure 4:
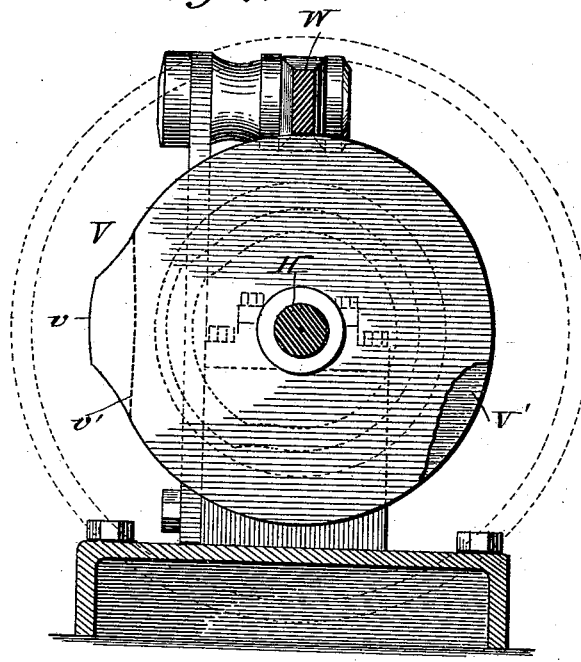
Figure 6:
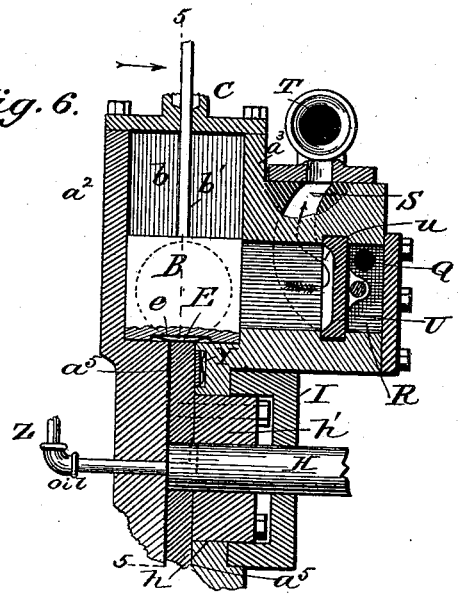
Figure 5:
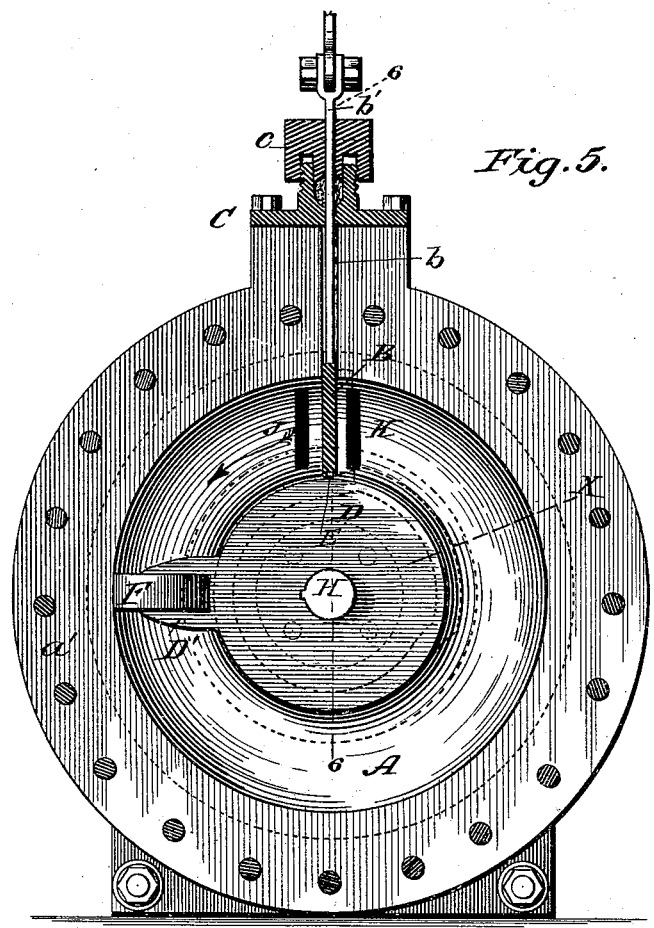
Figure 8:
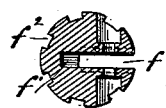
Figure 7:
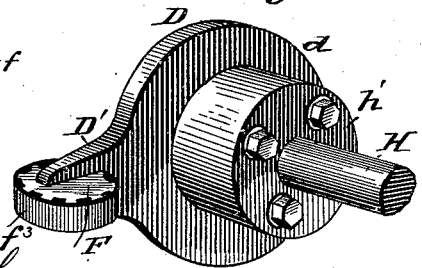
Figure 9:
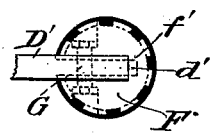

Figure 1 is a side elevation of my improved rotary engine. Fig. 2 is a top plan view thereof. Fig. 3 is a sectional end view taken on the line 3 3, Fig. 2, looking in the direction indicated by the arrow marked $a$. Fig. 4 is a similar view on the line 4 4, Fig. 2, looking in the direction indicated by the arrow marked $b$. Fig. 5 is a section taken on the line 5 5 of Fig. 6, showing the interior of the annular steam-chamber, the piston, and the gate or abutment. Fig. 6 is a detail sectional view taken on the line 6 6, Fig. 5. Fig. 7 is a perspective view of the piston-carrying disk and the piston. Figs. 8 and 9 are detail views of the piston-head, hereinafter referred to; and Fig. 10 is a transverse section taken on the line 10, Fig. 1, illustrating the arrangement of the ports, the inlet and outlet pipes connected therewith, and the cut-off valve, hereinafter referred to.

In the accompanying drawings, A indicates the annular steam-chamber, which is circular in cross-section and which is formed of the sections $a$ $a'$, secured together in the manner shown, the outer section having an enlarged or squared portion $a^2$ at the top, which in connection with the enlarged or head portion $a^3$ of the section $a'$ forms the guide or seat for the slide-gate or abutment B, arranged to reciprocate transversely over the annular chamber, as clearly shown in Fig. 6 of the drawings, by reference to which and to Fig. 5 it will be seen that a pocket $b$ is formed in the sections $a^2$ and $a^3$, which is covered by the cap-plate C, formed with a stuffing-box $c$, through which operates the stem $b'$ of the gate B. The meeting faces of the sections $a$ $a'$ are recessed at $a^5$ $a^5$ to form an annular space, in which operates the piston-carrying disk D, which fits in said space, being in practice held steam-tight therein. By referring to Fig. 6 it will be seen that the peripheral edge $d$ of the disk D extends flush with the lower edge of the chamber A, and the lower edge of said gate extends down and bears against said edge $d$, being held for tight frictional contact therewith by means of the spring E, seated in a depression $e$ in the bottom of the gate, as shown.

The disk D is formed with a radial arm D′, which carries the piston, the construction of which is most clearly shown in Figs. 7, 8, and 9 of the drawings and which consists of a circular disk F, having a cut-out portion $f$, the inner end of which forms a socket $f'$, which cut-out portion receives the radial arm D′, the end of which is reduced at $d'$ and fits the said socket $f'$, the disk F and the arm D being held together by the transverse bolt G, as shown. The peripheral edge of the piston F is formed with a series of transverse sockets $f^2$, adapted to receive packing, and around the edge thereof is held a packing-ring $f^3$.

By reference to Figs. 5 and 7 the construction and arrangement of the circular steam-chamber and the piston will be readily understood. It will be seen that such construction, while being of a simple nature, provides for a positive operation of the piston without the danger of loss of power by undue leakage.

The disk D is centrally apertured to fit on the drive-shaft H, and is provided with a gland $h'$, which seats in an opening $h$ in the section $a'$, and to hold said gland steam-tight I incase it by a cap-plate I, as shown. The gate B is arranged centrally over the drive-shaft and is disposed between the steam-ports J and K, of which in the present instance J indicates the inlet and K the exhaust port.

To provide means whereby to obtain an almost complete revolution of the piston on the full head of steam and to operate the gate and cut-off quickly, I employ suitable cam mechanism arranged upon the shaft, which at proper intervals operates to cut off the steam-supply and raise and lower the gate.

By referring to Fig. 3 it will be noticed that to the shaft H is keyed or otherwise secured a disk L, which has formed in its front face a cam-groove $l$, in which projects the end $m$ of a pivoted rocking lever M, the front end $m'$ of which is connected with the lower end of the stem $n$ of a cut-off valve N, which operates in a valve-chamber O, connected with the steam-supply pipe P, said valve N operating over the supply-channel Q, which enters the steam-port chamber R, as most clearly shown in Fig. 10. By reference to said Fig. 10 and Fig. 6 it will be seen that said chamber R communicates with the ports J K and a port S, which port communicates with the exhaust-port T.

U indicates an adjustable slide-valve, which is formed with the usual steam-groove $u$ and which is arranged to be shifted, so as to render either of the ports J or K the live port. When the valve is in the position shown in Fig. 10, steam will enter the port J and escape into the steam-chamber and exhaust through the port K into the groove $u$ and out through the exhaust T, as indicated by arrow in Fig. 6.

The arrangement of the cam-groove in the disk L is such that when the disk is in the position shown in dotted lines in Fig. 5 the piston will be at a point marked X in said figure. At this time the cam portion $l^x$ of the groove $l$ will elevate the end $m$ of lever M and lower end $m'$ and bring the cut-off over the steam-orifice R, thereby cutting off the steam. At the same time a cam-disk V on the shaft H will engage with its cam $v$ the arm $w$ of a rocking lever W, the front end of which extends over the steam-chamber and connects with the stem $b'$ of the gate B and raises said end, thereby lifting the gate out of the path of the piston. It will also be noticed by reference to Figs. 1 and 4 that a second disk V' is provided, which is formed with a cut-away portion $v'$, on which rests the rear end $w'$ of the lever W when the front end thereof is raised, as before stated. Now when the steam is cut off, as stated, the piston, after having been carried to the position indicated by X under a full head of steam, is carried past the exhaust-port K by the expansion of the steam in the chamber, and as it passes said port the steam exhausts through port K. At this time disk V' will in its revolution engage the rear end of the lever W and cause the gate to again close, and immediately thereafter the end $m$ of the lever M will be depressed and the end $m'$ elevated to lift the cut-off and open the supply-orifice.

To prevent leakage or escape of steam from the inlet to the outlet port between the upper inner face of the disk D and the adjacent face of the section $a$ I provide a spring-actuated packing-plate Y, as shown.

Z indicates a lubricant-supply pipe, which leads oil to the shaft and disk D in a manner clearly shown in Fig. 6 of the drawings.

From the foregoing description, taken in connection with the drawings, the advantages of my improved engine will be readily understood, the same being very simple in its construction, a great amount of power being obtainable with a moderate pressure and without danger of great loss from waste. It will be also understood that the several cam-disks which operate the cut-off valve and gate may be arranged to operate the gate and cut-off when the piston is near the end of its stroke or at any point in advance thereof.

$A^5$ indicates a governor of the usual construction, which is operated by the bevel-gears 10 to 20, the gear 20 being on a shaft $a^6$, operated by a belt $B^5$, which passes over pulleys on the shafts $a^6$ and H.

Having thus described my invention, what I claim, and desire to secure by Letters Patent, is—

In a rotary engine, the combination, with annular steam-chamber, a shaft operating centrally thereof and extended rearward, the concentric piston secured thereto, the steam-chest, the inlet and outlet ports, the sliding abutment, and the cut-off devices in the steam-chest, of a tilting lever W, connected with the gate, a similar lever M, connected with the cut-off devices, the cam-disk L, secured upon the shaft for operating the lever M, and the oppositely-operating cam-disks V V' upon the line-shaft adapted to engage the lever W, all arranged in the manner shown, and for the purpose described.

STEPHEN H. BLOOMER.

Witnesses:
FRED G. DIETERICH,
SOLON C. KEMON.